(No Model.)
H. FARMER.
CHECK ROWER CORD.
No. 274,579. Patented Mar. 27, 1883.
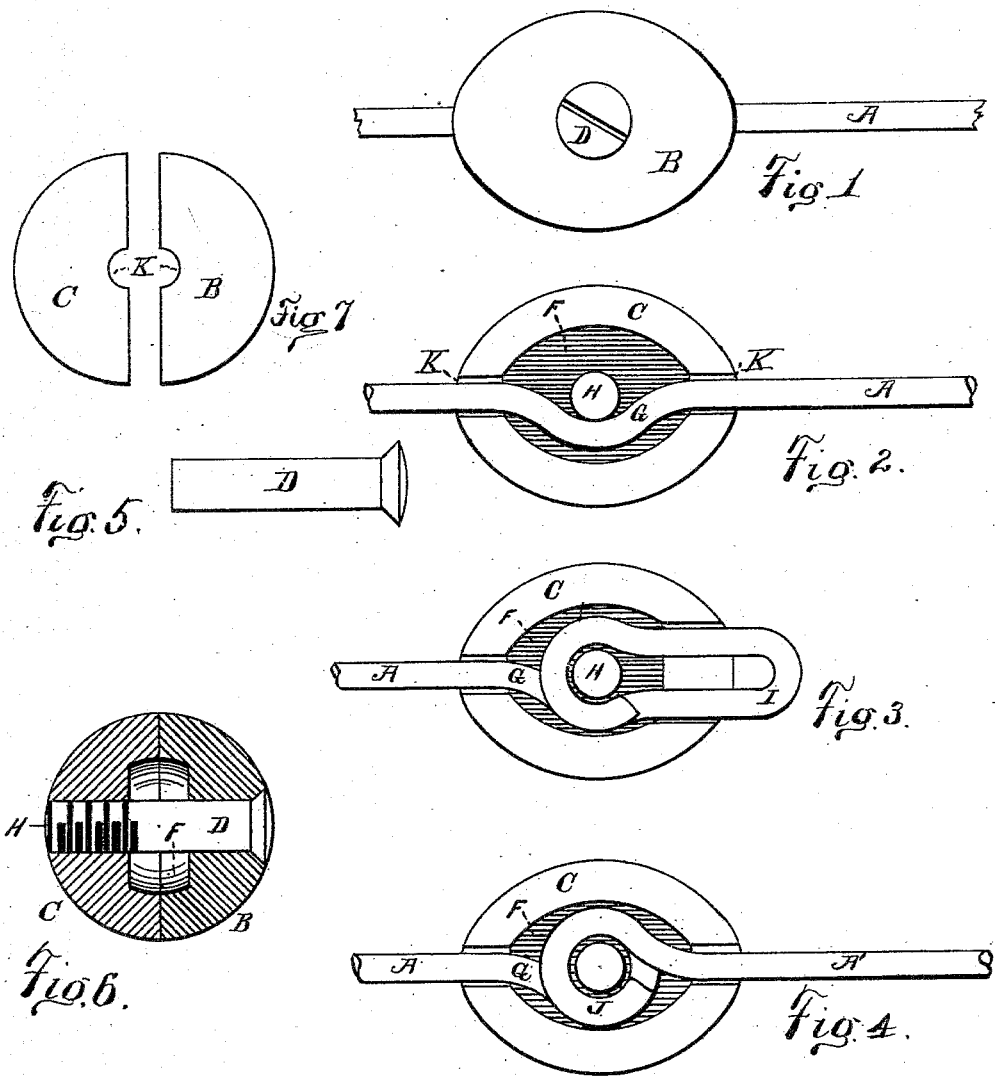
WITNESSES:
John R. Woods
John Lorenz
Henry Farmer INVENTOR
by James W. See
ATTORNEY

UNITED STATES PATENT OFFICE.

HENRY FARMER, OF RICHMOND, INDIANA, ASSIGNOR OF ONE-HALF TO HENRY P. DEUSCHER, OF HAMILTON, OHIO.

CHECK-ROWER CORD.

SPECIFICATION forming part of Letters Patent No. 274,579, dated March 27, 1883.

Application filed July 24, 1882. (No model.)

*To all whom it may concern:*

Be it known that I, HENRY FARMER, of Richmond, Wayne county, Indiana, have invented certain new and useful Improvements in Check-Rower Cords, of which the following is a specification.

This invention relates to the construction of the cord-stop and its method of union with cord.

In the accompanying drawings, Figure 1 is a view of a section of cord with stop attached. Figs. 2, 3, and 4, views with the stop opened; Fig. 5, a view of the rivet; Fig. 6, a vertical section of the stop, and Fig. 7 an end view of the parts of the stop.

The stop is composed of two similar halves, B C, arranged to be clamped upon the cord A by screw or rivet D, which is separable from the halves and passes through them both. Cavities F, of similar form, in the inner faces of the halves, allow room for the cord or wire as it passes around the screw or rivet. Openings K at each end of stop are for the admission of the wire or cord. In the figures showing the stop open, H is the part of the screw or rivet D which the wire or cord must pass by or make room for as it lies in the cavity F. As shown in Figs. 2, 3, and 4, the stop may be adapted for use upon continuous wires or cords, or upon wires articulated or spliced at or contiguous to the stop. The stop may be removed from the cord and used in other positions upon the same or other cords or wires, and the halves being identical in the riveted form, in case a half be missing from a stop that half may be replaced by any other half which may be found. This is not the case with a stop formed of dissimilar halves.

I claim as my invention—

A check-row stop consisting of the two like halves B C, having openings K and recesses F, and the rivet D, passing through both halves, combined substantially as set forth.

HENRY FARMER.

Witnesses:
JOHN LORENZ,
E. A. BELDEN.